UNITED STATES PATENT OFFICE.

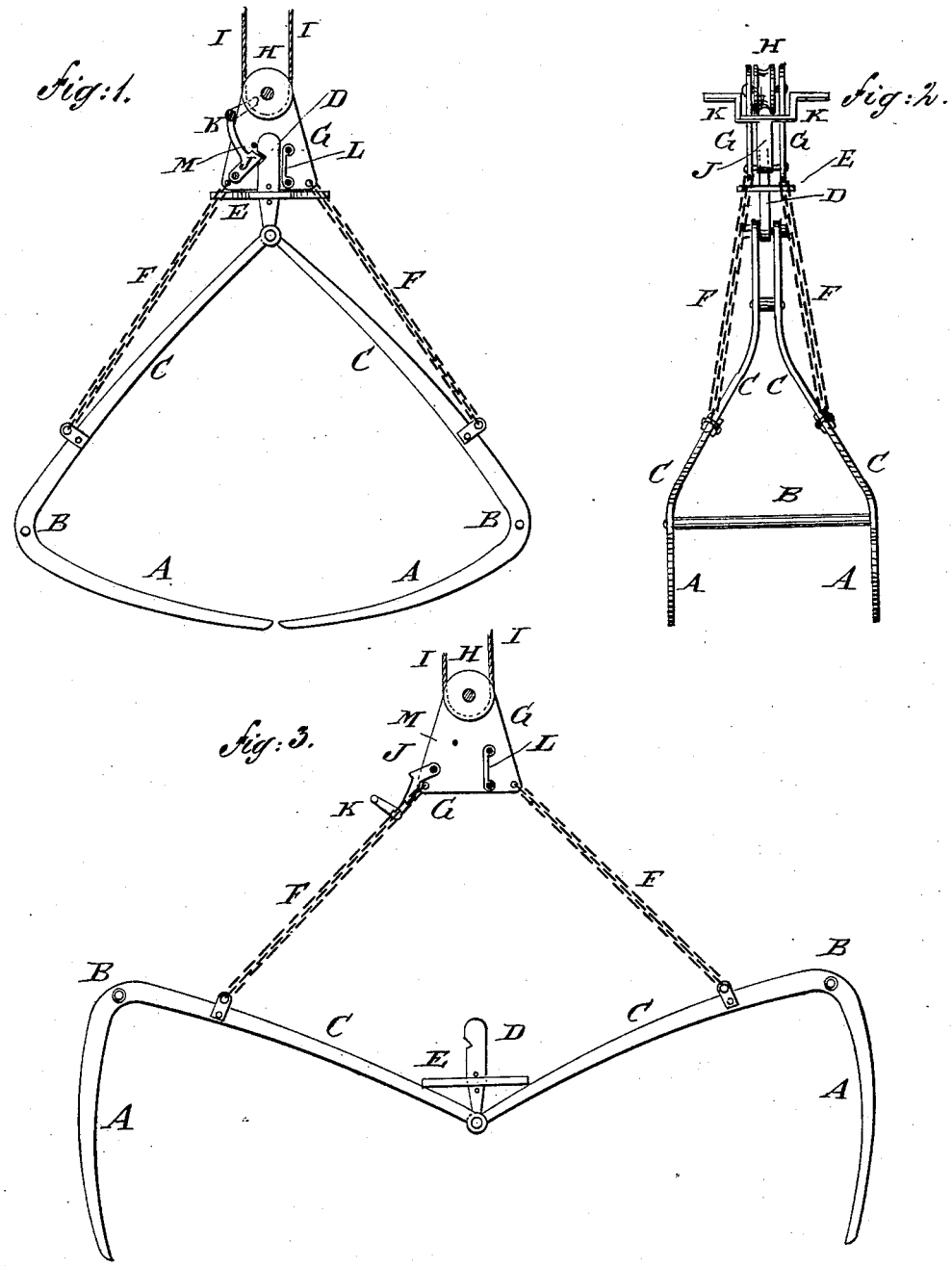

TOWNSEND ALBERTSON, OF MINEOLA, NEW YORK, ASSIGNOR TO HIMSELF AND THOMAS W. ALBERTSON, OF SAME PLACE.

HORSE HAY-FORK.

SPECIFICATION forming part of Letters Patent No. 245,760, dated August 16, 1881.

Application filed June 30, 1881. (No model.)

*To all whom it may concern:*

Be it known that I, TOWNSEND ALBERTSON, of Mineola, in the county of Queens and State of New York, have invented a new and useful Improvement in Horse Hay-Forks, of which the following is a specification.

Figure 1 is a side elevation of my improvement shown in position for carrying a load. Fig. 2 is a rear elevation of the same. Fig. 3 is a side elevation of the same shown in position for discharging a load.

Similar letters of reference indicate corresponding parts.

The object of this invention is to promote convenience in operating horse hay-forks and lessen the cost of constructing the said forks.

The invention consists in a horse hay-fork constructed of the tines, shanks, and cross-bars, the catch hinged to the inner ends of the tine-shanks, and having a stop-bar attached to it, plates and pulley, the latch having projecting trip-arms, and the guide and stop attached to the pulley-block plates, as will be hereinafter fully described.

In the accompanying drawings, A represents the fork-tines, which are curved inward, as shown in Figs. 1 and 3, and are connected in pairs by a cross-bar, B, as shown in Fig. 2. The shanks C of the tines A are hinged at their inner ends to each other, and to a catch, D, as shown in Figs. 1, 2, and 3.

The catch D is provided with a cross bar or plate, E, as shown in Figs. 1 and 3, for the shanks C to strike against when the fork is opened, to prevent the said fork from being opened too far.

To the shanks C, near their outer ends, are attached the lower ends of short chains F, the upper ends of which are attached to the lower corners of the plates G, which serve as a pulley-block.

To and between the upper ends of the plates G is pivoted a pulley, H, around which passes the rope I, that connects the fork with the carriage. To and between the plates G, near one of their lower corners, is pivoted a latch, J, the free end of which engages with the notched upper end of the latch D, as shown in Fig. 1, to lock the fork closed.

Upon the latch J are formed trip-arms K, which are made in the form of cranks, as shown in Fig. 2, to form a recess to receive the upper part of the pulley-block G and project upon the opposite sides thereof, so as to serve as trip-arms to engage with cleats or other stops attached to the track upon which the carriage runs.

To and between the plates G is secured a small plate, L, by means of pins attached to the said plates, or by other suitable means. The plate L serves as a stop and guide to the catch D to hold the said catch against the pressure of the latch J, and to bring the said catch into proper position to engage with the said latch. To the plates G is also attached a pin, M, to serve as a stop to prevent the latch J from moving inward too far. With this construction, as the fork is drawn back and lowered upon the load the tines A are supported by the chains F in the position shown in Fig. 3, ready to be thrust into the hay. As the tines A are thrust into the hay their curved shape causes them to move inward slightly, and the pulley-block G is drawn downward, so that the catch D will pass between the plates G, and the latch J can be swung inward to engage with it and lock the tines securely in place until the said latch is thrown back by the trip-arms K striking against the stop-cleat attached to the track, by the action of which the said latch is withdrawn from the catch D, allowing the tines to be forced apart by the weight of the fork-load, causing the said tines to take the position shown in Fig. 3 and discharge the hay.

Having thus fully described my invention, I claim as new and desire to secure by Letters Patent—

1. In a horse hay-fork, the combination of the tines, shanks, and cross-bars A C B, the catch D, hinged to the inner ends of the said shanks, and having stop-bar E, the plates and pulley G H, the latch J, having trip-arms K, and the stops L M and connecting-chains F, as set forth.

2. In a horse hay-fork, the combination, with the tines, shanks, and cross-bars A C B, the plates and pulley G H, and the connecting-chains F, of the catch D and the latch J, having trip-arms K, substantially as herein shown and described, whereby the fork will be securely locked and will be tripped automatically, as set forth.

TOWNSEND ALBERTSON.

Witnesses:
JAMES T. GRAHAM,
C. SEDGWICK.